(12) United States Patent
Rule et al.

(10) Patent No.: US 11,082,229 B2
(45) Date of Patent: Aug. 3, 2021

(54) SYSTEM AND METHOD FOR PRE-AUTHENTICATION OF CUSTOMER SUPPORT CALLS

(71) Applicant: Capital One Services, LLC, McLean, VA (US)

(72) Inventors: Jeffrey Rule, McLean, VA (US); Rajko Ilincic, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/356,987

(22) Filed: Mar. 18, 2019

(65) Prior Publication Data

US 2020/0304310 A1  Sep. 24, 2020

(51) Int. Cl.

| H04L 9/32 | (2006.01) |
|---|---|
| H04L 9/08 | (2006.01) |
| H04L 9/14 | (2006.01) |
| H04L 29/06 | (2006.01) |
| H04M 3/51 | (2006.01) |
| H04W 12/062 | (2021.01) |

(52) U.S. Cl.
CPC .......... *H04L 9/3234* (2013.01); *H04L 9/0861* (2013.01); *H04L 9/0897* (2013.01); *H04L 9/14* (2013.01); *H04L 63/0853* (2013.01); *H04M 3/5183* (2013.01); *H04W 12/062* (2021.01); *H04L 2463/082* (2013.01); *H04M 2203/6045* (2013.01)

(58) Field of Classification Search
CPC ... H04L 9/3234; H04L 9/0861; H04L 9/0897; H04L 9/14; H04L 63/0853; H04L 2463/082; H04M 3/5183; H04M 2203/6045; H04W 12/0602

See application file for complete search history.

(56) References Cited

U.S. PATENT DOCUMENTS

| 4,683,553 A | 7/1987 | Mollier |
|---|---|---|
| 5,537,314 A | 7/1996 | Kanter |
| 5,768,373 A | 6/1998 | Lohstroh et al. |
| 5,778,072 A | 7/1998 | Samar |
| 5,929,413 A | 7/1999 | Gardner |
| 6,021,203 A | 2/2000 | Douceur et al. |

(Continued)

OTHER PUBLICATIONS

Breekel et al., "EMV in a nutshell", Jun. 29, 2016, pp. 1-37 (Year: 2016).*

(Continued)

*Primary Examiner* — Jeffrey D. Popham
(74) *Attorney, Agent, or Firm* — Kacvinsky Daisak Bluni PLLC

(57) ABSTRACT

A system and method are disclosed that leverage multi-factor authentication features of a service provider and intelligent call routing to increase security and efficiency at a customer call center. Pre-authentication of customer support requests reduces the potential for misappropriation of sensitive customer data during call handling. A contactless card uniquely associated with a client may provide a second factor of authentication to reduce the potential for malicious third-party impersonation of the client. Pre-authorized customer support calls are intelligently and efficiently routed in a manner that reduces the opportunity for malicious call interference and information theft.

8 Claims, 10 Drawing Sheets

(56) References Cited

U.S. PATENT DOCUMENTS

| | | | |
|---|---|---|---|
| 6,342,844 B1 | 1/2002 | Rozin | |
| 6,731,778 B1 | 5/2004 | Oda et al. | |
| 7,127,605 B1 | 10/2006 | Montgomery et al. | |
| 7,325,132 B2 | 1/2008 | Takayama et al. | |
| 7,373,515 B2 | 5/2008 | Owen et al. | |
| 7,703,142 B1 | 4/2010 | Wilson et al. | |
| 7,748,609 B2 | 7/2010 | Sachdeva et al. | |
| 7,805,755 B2 | 9/2010 | Brown et al. | |
| 7,827,115 B2 | 11/2010 | Weller et al. | |
| 7,900,048 B2 | 3/2011 | Andersson | |
| RE42,762 E | 9/2011 | Shin et al. | |
| 8,103,249 B2 | 1/2012 | Markison | |
| 8,108,687 B2 | 1/2012 | Ellis et al. | |
| 8,215,563 B2 | 7/2012 | Levy et al. | |
| 8,381,307 B2 | 2/2013 | Cimino | |
| 8,511,542 B2 | 8/2013 | Pan | |
| 8,572,386 B2 | 10/2013 | Takekawa et al. | |
| 8,750,514 B2 | 6/2014 | Gallo et al. | |
| 8,752,189 B2 | 6/2014 | de Jong | |
| 8,898,088 B2 | 11/2014 | Springer et al. | |
| 9,203,800 B2 | 12/2015 | Izu et al. | |
| 9,338,622 B2 | 5/2016 | Bjontegard | |
| 9,665,858 B1 | 5/2017 | Kumar | |
| 9,891,823 B2 | 2/2018 | Feng et al. | |
| 9,894,199 B1 | 2/2018 | Wiechman et al. | |
| 9,961,194 B1* | 5/2018 | Wiechman | H04M 3/42068 |
| 2002/0165827 A1 | 11/2002 | Gien et al. | |
| 2003/0023554 A1 | 1/2003 | Yap et al. | |
| 2003/0167350 A1 | 9/2003 | Davis et al. | |
| 2004/0015958 A1 | 1/2004 | Veil et al. | |
| 2004/0039919 A1 | 2/2004 | Takayama et al. | |
| 2005/0044367 A1 | 2/2005 | Gasparini et al. | |
| 2005/0138387 A1 | 6/2005 | Lam et al. | |
| 2005/0160049 A1 | 7/2005 | Lundholm | |
| 2006/0047954 A1 | 3/2006 | Sachdeva et al. | |
| 2006/0173985 A1 | 8/2006 | Moore | |
| 2007/0055630 A1 | 3/2007 | Gauthier et al. | |
| 2007/0061266 A1 | 3/2007 | Moore et al. | |
| 2007/0061487 A1 | 3/2007 | Moore et al. | |
| 2007/0203850 A1 | 8/2007 | Singh et al. | |
| 2007/0256134 A1 | 11/2007 | Lehtonen et al. | |
| 2008/0086767 A1 | 4/2008 | Kulkarni et al. | |
| 2008/0120711 A1 | 5/2008 | Dispensa | |
| 2008/0308641 A1 | 12/2008 | Finn | |
| 2009/0037275 A1 | 2/2009 | Pollio | |
| 2009/0217039 A1 | 8/2009 | Kurapati et al. | |
| 2010/0082491 A1 | 4/2010 | Rosenblatt et al. | |
| 2010/0257357 A1 | 10/2010 | McClain | |
| 2011/0028160 A1 | 2/2011 | Roeding et al. | |
| 2011/0068170 A1 | 3/2011 | Lehman | |
| 2011/0084132 A1 | 4/2011 | Tofighbakhsh | |
| 2011/0246780 A1 | 10/2011 | Yeap et al. | |
| 2012/0109764 A1 | 5/2012 | Martin et al. | |
| 2012/0207305 A1 | 8/2012 | Gallo et al. | |
| 2012/0254394 A1 | 10/2012 | Barras | |
| 2013/0008956 A1 | 1/2013 | Ashfield | |
| 2013/0048713 A1 | 2/2013 | Pan | |
| 2013/0104251 A1 | 4/2013 | Moore et al. | |
| 2013/0226791 A1 | 8/2013 | Springer et al. | |
| 2013/0282360 A1 | 10/2013 | Shimota et al. | |
| 2013/0312082 A1 | 11/2013 | Izu et al. | |
| 2014/0020073 A1 | 1/2014 | Ronda et al. | |
| 2014/0047235 A1 | 2/2014 | Lessiak et al. | |
| 2014/0067690 A1 | 3/2014 | Pitroda et al. | |
| 2014/0138435 A1 | 5/2014 | Khalid | |
| 2014/0161258 A1* | 6/2014 | Yang | H04W 12/0401 380/270 |
| 2014/0171039 A1 | 6/2014 | Bjontegard | |
| 2014/0258125 A1 | 9/2014 | Gerber et al. | |
| 2015/0019442 A1 | 1/2015 | Hird et al. | |
| 2015/0071486 A1 | 3/2015 | Rhoads et al. | |
| 2015/0088757 A1 | 3/2015 | Zhou et al. | |
| 2015/0134452 A1 | 5/2015 | Williams | |
| 2015/0140960 A1 | 5/2015 | Powell et al. | |
| 2015/0154595 A1 | 6/2015 | Collinge et al. | |
| 2015/0186871 A1 | 7/2015 | Laracey | |
| 2015/0332266 A1 | 11/2015 | Friedlander et al. | |
| 2016/0012465 A1 | 1/2016 | Sharp | |
| 2016/0026997 A1 | 1/2016 | Tsui et al. | |
| 2016/0065370 A1 | 3/2016 | Le Saint et al. | |
| 2016/0232523 A1 | 8/2016 | Venot et al. | |
| 2017/0004502 A1 | 1/2017 | Quentin et al. | |
| 2017/0017964 A1 | 1/2017 | Janefalkar et al. | |
| 2017/0041759 A1 | 2/2017 | Gantert et al. | |
| 2017/0103664 A1* | 4/2017 | Wong | G09B 7/00 |
| 2017/0289127 A1 | 10/2017 | Hendrick | |
| 2017/0295013 A1 | 10/2017 | Claes | |
| 2017/0337542 A1 | 11/2017 | Kim et al. | |
| 2018/0240106 A1 | 8/2018 | Garrett et al. | |
| 2018/0300716 A1 | 10/2018 | Carlson | |
| 2018/0359100 A1 | 12/2018 | Gaddam et al. | |
| 2019/0014107 A1 | 1/2019 | George | |
| 2019/0019375 A1 | 1/2019 | Foley | |
| 2019/0036678 A1 | 1/2019 | Ahmed | |
| 2019/0238517 A1 | 8/2019 | D'Agostino et al. | |

OTHER PUBLICATIONS

Pourghomi et al., "A Proposed NFC Payment Application" 2013, pp. 173-181 (Year: 2013).*

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC", Annex Cloud [online] May 19, 2017 [retrieved on Jul. 3, 2019]. Retrieved from Internet URL: https://www.annexcloude.com/blog/benefits-unified-platform/, 13 pages.

International Search Report and Written Opinion for International Patent Publication No. PCT/US2020/023134 dated May 20, 2020, 13 pages.

International Search Report and Written Opinion for International Patent Application No. PCT/US20201022809 dated May 18, 2020, 11 pages.

* cited by examiner

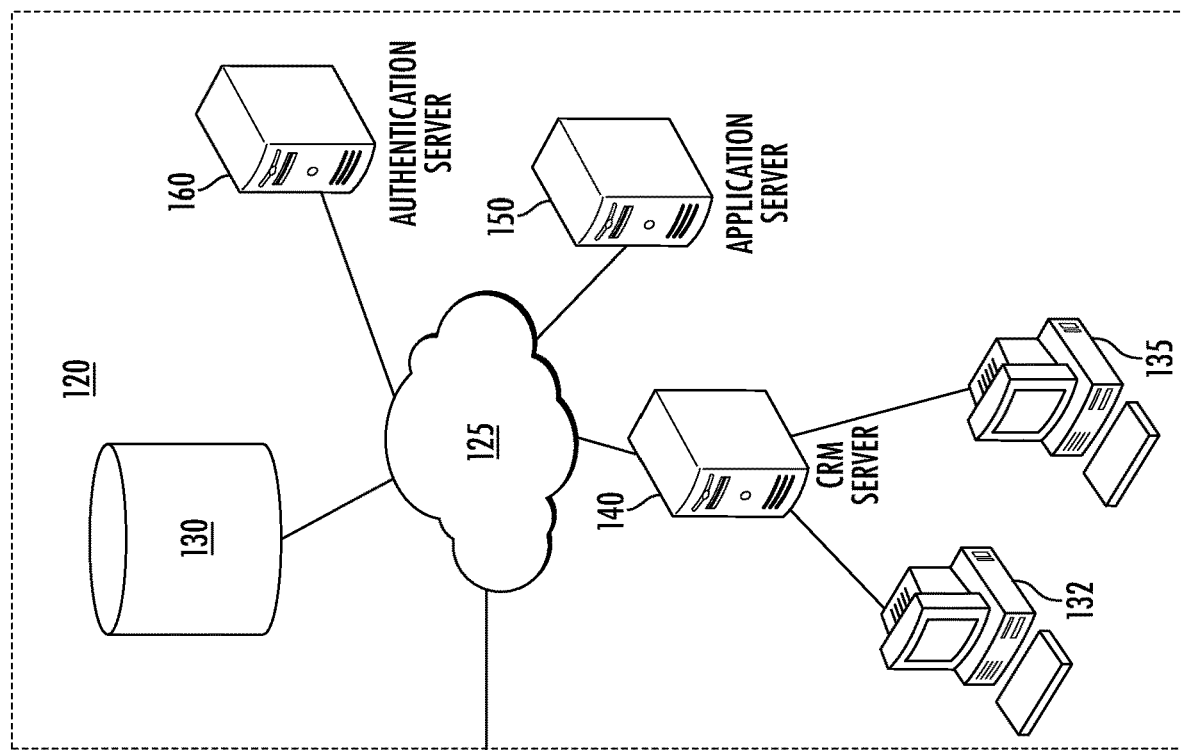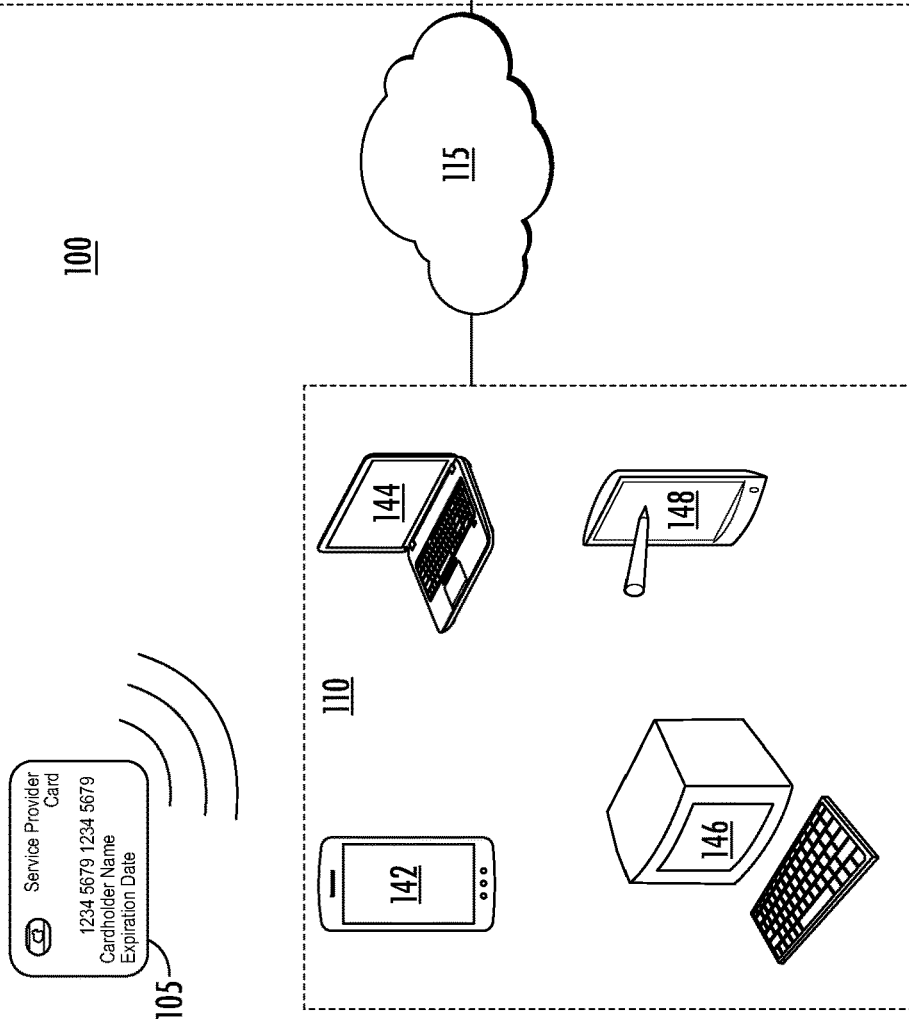
FIG. 1A

SYSTEM AND METHOD FOR PRE-AUTHENTICATION OF CUSTOMER SUPPORT CALLS

BACKGROUND

Call center services are typically provided by service providers to enable clients to access, modify, delete or otherwise control their accounts. From a security standpoint call centers can be the riskiest areas of an enterprise because call center transactions may expose sensitive customer information to malicious third parties.

Call centers face both internal and external risks. Internal risks include employee theft of sensitive customer information. During a typical authentication process, call center employees have direct access to sensitive customer data. Call centers may be outsourced, and call center employees have a high turnover rate. As a result, companies are constantly at risk that departing or remote employees may improperly retain customer information.

External risks include those posed by "spoofing" and "phishing" where imposters mask or modify incoming numbers, email addresses, IP addresses, etc., to pose as clients in an attempt to steal information or funds. External risks are also posed by hackers that monitor service provider communications, in particular, call center communications, for the purpose of stealing customer information.

To address these security concerns, the Payment Card Industry Security Standards Council (PCI SSC) manages the ongoing evolution of the Payment Card Industry (PCI) security standards. Service providers are responsible for enforcing compliance with PCI standards to protect sensitive customer data. For example, the PCI standards may dictate authentication standards to be followed prior to permitting a client to access and/or modify customer account information. Call centers may require client authentication in the form of exchange of passwords, answers to personal questions, biometric data or the like. Customers may be prompted multiple times to provide authentication information in various forms during the handling of a call. Not only can this authentication and re-authentication process frustrate a client and degrade the service provider goodwill, each authentication instance potentially exposes sensitive customer information to potentially malicious parties.

SUMMARY

According to one aspect of the invention, a method for pre-authenticating support requests received by a service provider from one or more coupled devices includes the steps of receiving a support request from a client operating a client device that has been authorized to access a service provider application in response to first authentication information provided by the client. In response to the support request, the method includes requesting second authentication information from the client, the second authentication information including a cryptogram and receiving the second authentication information including the cryptogram from the client device. The method includes selectively validating the client by decrypting at least a portion of the second authentication information using a copy of a key associated with the client and maintained by the service provider. The method includes the steps of, responsive to validation of the client, initiating a call with the client device and directing a call center support service to bypass an authorization step of a call center support process to expedite handling of the initiated call. With such an arrangement, multi-factor authentication mechanisms of the service provider may be leveraged for use with customer support services, thereby increasing the efficiency of client issue resolution and increasing customer information security.

According to another aspect of the invention, a system for pre-authenticating customer service support requests received at a service provider from one or more coupled client devices includes a client interface adapted to exchange information with one or more coupled client devices. The system also includes a storage device and a diversified key table stored in the storage device and comprising an entry for at least one client of the service provider, the entry including first and second authentication information for the client. The system further includes an authentication unit, coupled to the client interface and the diversified key table, for retrieving one of the first or second authentication information upon receipt of a client request by the client interface and for authorizing the client request in response to the retrieved first or second authentication information. A customer call center interface is coupled to the authentication unit, for selectively forwarding a support request, received from a client device, to a call center service, the support request forwarded following authorization of the support request by the authentication unit, the customer call center interface augmenting the support request to direct the call center service to bypass authentication of the support request by a call center service process.

According to a further aspect of the invention, a method for pre-authenticating support requests received by a service provider from one or more coupled client devices includes the steps of receiving a support request from a client device that has been authorized to access a service provider application in response to first authentication information provided by the client. In response to receiving the support request, the method includes prompting a client to engage a card with the client device to retrieve second authentication information from the card, the second authentication information including a cryptogram and receiving the second authentication information. The method includes selectively validating the support request by decrypting at least a portion of the second authentication information using a derivative key associated with the client and maintained by the service provider. Responsive to validation of the support request, the method includes establishing a communication link between a call center support service and the client device by forwarding communication link information to at least one of the client device and the call center support service to cause one of the client device or call center support service to contact the other and directing a call center support service to bypass an authorization step of a call center support process for each incoming call that has previously been validated by the service provider.

BRIEF DESCRIPTION OF THE DRAWINGS

FIG. 1A is a block diagram of a data transmission system configured to pre-authenticate customer requests according to an example embodiment;

DETAILED DESCRIPTION

Figure 1B:
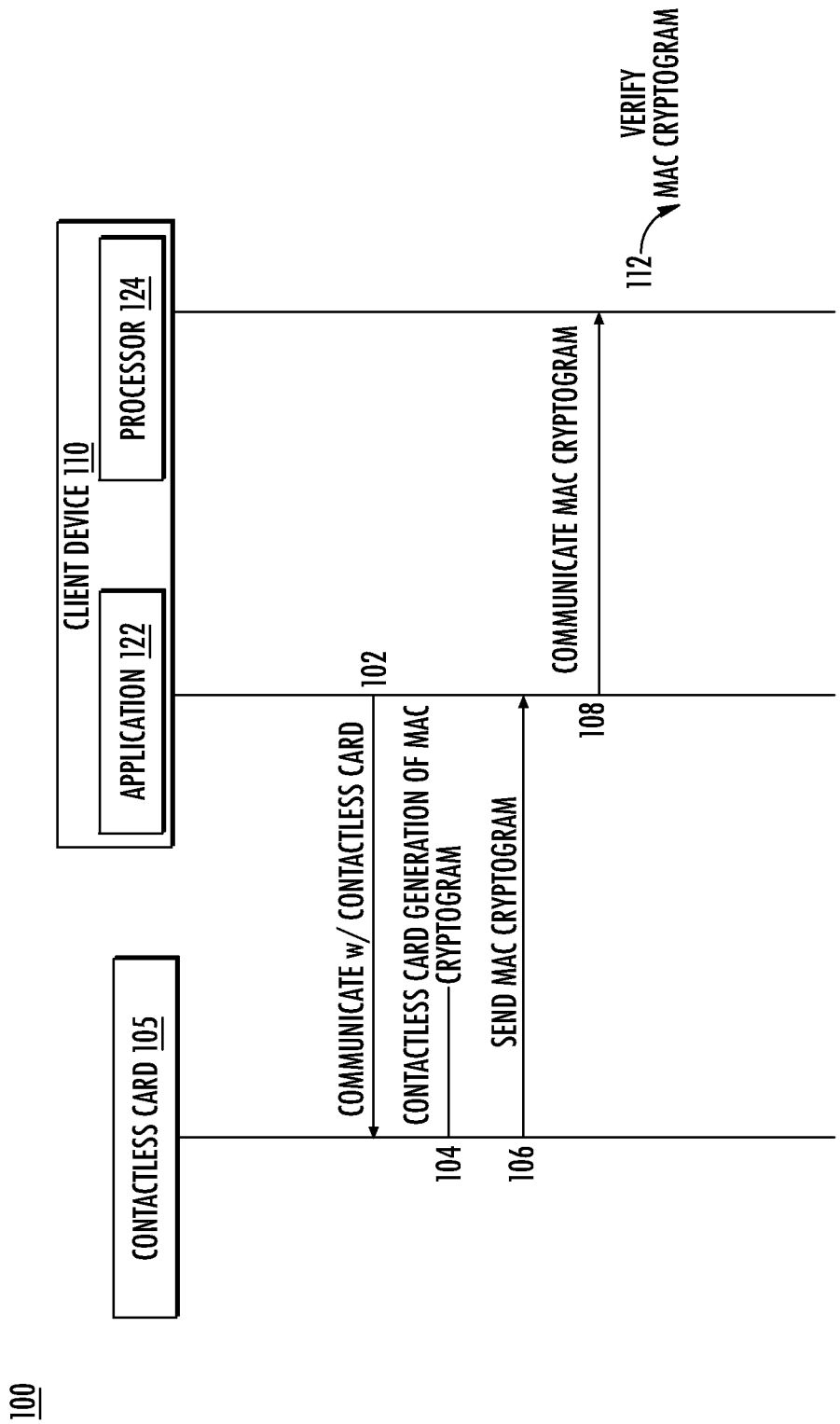
FIG. 1B is a diagram illustrating a sequence for providing authenticated access according to an example embodiment.

An objective of some embodiments of the present disclosure is the use of one or more keys that have been incorporated into one or more contactless cards as described in U.S. patent application Ser. No. 16/205,119 filed Nov. 29, 2018 by Osborn, et. al, entitled "Systems and Methods for Cryptographic Authentication of Contactless Cards" and incorporated herein by reference (hereinafter the '119 Application). The contactless card may be used to perform authentication and numerous other functions that may otherwise require the user to carry a separate physical token in addition to the contactless card. By employing a contactless interface, contactless cards may be provided with a method to interact and communicate between a user's device (such as a mobile phone) and the card itself. For example, the EMV protocol, which underlies many credit card transactions, includes an authentication process which suffices for operating systems for Android® but presents challenges for iOS,®, which is more restrictive regarding near field communication (NFC) usage, as it can be used only in a read-only manner. Unlike RFID which may be used to read devices in motion to at a significant distance. Exemplary embodiments of the contactless cards described in the '119 Application may utilize NFC technology.

A system and method are disclosed that leverage multi-factor authentication features of a service provider and intelligent call routing to increase security and efficiency at a customer call center. Pre-authentication of customer support requests reduces the potential for misappropriation of sensitive customer data during call handling. A contactless card uniquely associated with a client may provide a second factor of authentication to reduce the potential for malicious third-party impersonation of the client. Pre-authorized customer support calls are intelligently and efficiently routed in a manner that reduces the opportunity for malicious call interference and information theft.

These and other features of the invention will now be described with reference to the figures, wherein like reference numerals are used to refer to like elements throughout.

As used in this application, the terms "system", "component" and "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

FIG. 1A illustrates a system 100 including one or more client devices 110 coupled to a service provider 120 via a network 115. According to one aspect, the client devices 110 comprise network-enabled computers and communicate with the service provider 120 via networks 115 and 125 to access service provider content and services.

As referred to herein, a network-enabled computer may include, but is not limited to: e.g., a computer device, or communications device including, e.g., a server, a network appliance, a personal computer (PC), a workstation, a mobile device, a phone, a handheld PC, a personal digital assistant (PDA), a thin client device, a fat client device, an Internet browser, or other device.

The client devices 110 thus can include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

One or more client devices 110 also may be a mobile device for example, such as an iPhone, iPod, iPad from Apple® or any other mobile device running Apple's iOS operating system, any device running Microsoft's Windows® Mobile operating system, and/or any other smartphone or like wearable mobile device.

Various client devices 110 of FIG. 1A include a cellular phone 142, a laptop 144, a tablet 148 and a terminal 146. Client devices 110 may include a thin client application specifically adapted for communication with the service provider 120. The thin client application may be stored in a memory of the client device and be operable when executed upon by the client device to control an interface between the client device and a service provider application, permitting a user at the client device to access service provider content and services.

In some examples, network 115 may be one or more of a wireless network, a wired network or any combination of wireless network and wired network and may be configured to connect client device 110 to service provider 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network ("WAN"), a wireless personal area network ("WPAN"), a local area network ("LAN"), or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices.

It should be appreciated that according to one or more examples, network 115 may be part of a plurality of interconnected networks, such as, for example, the Internet, a service provider's private network 125, a cable television network, corporate networks, such as credit card association networks, and home networks. In addition, private network 125 may be implemented as a virtual private network layered upon network 115.

Service provider 120 is, in one embodiment, a business providing computer-based services to clients over a network 115. Almost all modern service providers use the internet to provide service offerings to potential consumers. The service offerings are generally provided in the form of software applications which operate using dedicated resources of the service provider. The combination of the software and hardware that provides a particular service to a client is referred to herein as a 'server'. The servers may communicate over a private network 125 of the service provider, often referred to as a corporate or enterprise network. The private network 125 may comprise a wireless network, a wired network or any combination of wireless network and wired network as described above with regard to network 115.

In the system of FIG. 1A, service provider 120 is shown to include an application server 150, an authentication server 160, and a Customer Relationship Management (CRM) server 140. Although each server is illustrated as a discrete device, it is appreciated that the applications and servers may be distributed throughout the enterprise or, in the case of distributed resources such as 'cloud' resources, throughout the network 115. The application server 150 may support one or more application services provided by the service provider 120, for example account management services. The CRM server 140 may be used to provide customer support services to clients of the service provider 120, including the processing and forwarding of incoming calls from clients to one or more call handling agents at working at workstations 132, 135.

Database 130 comprises data storage resources that may be used, for example, to store customer account, credential and other authentication information for use by the application server 150 and the authentication server 160. The database 130 may be comprised of coupled data resources comprising any combination of local storage, distributed data center storage or cloud-based storage.

According to one aspect, a contactless card 105 may be in wireless communication, for example, near field communication (NFC), with one or more client devices 110. For example, contactless card 105 may comprise one or more chips, such as a radio frequency identification chip, configured to communicate via NFC or other short-range protocols. In other embodiments, contactless card 105 may communicate with client devices 110 through other means including, but not limited to, Bluetooth, satellite, and/or WiFi. As described in the '119 application, contactless card 105 may be configured to communicate with one of a card reader terminal 146, a cellular phone 142, a laptop 144 and/or a tablet 148 through NFC when the contactless card 105 is within range of the respective client device. As will be described in more detail below, the contactless card 105 may include key and counter information that may be transformed using cryptographic algorithms to generate a cryptogram that may be used by the service provider to authenticate the client device.

FIG. 1B is a timing diagram illustrating an example sequence for providing authenticated access according to one or more embodiments of the present disclosure. System 100 may comprise contactless card 105 and client device 110, which may include an application 122 and processor 124. FIG. 1B may reference similar components as illustrated in FIG. 1A.

At step 102, the application 122 communicates with the contactless card 105 (e.g., after being brought near the contactless card 105). Communication between the application 122 and the contactless card 105 may involve the contactless card 105 being sufficiently close to a card reader (not shown) of the client device 110 to enable NFC data transfer between the application 122 and the contactless card 105.

At step 104, after communication has been established between client device 110 and contactless card 105, the contactless card 105 generates a message authentication code (MAC) cryptogram. In some examples, this may occur when the contactless card 105 is read by the application 122. In particular, this may occur upon a read, such as an NFC read, of a near field data exchange (NDEF) tag, which may be created in accordance with the NFC Data Exchange Format. For example, a reader, such as application 122, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 105 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string).

In some examples, application 122 may be configured to transmit a request to contactless card 105, the request comprising an instruction to generate a MAC cryptogram.

At step 106, the contactless card 105 sends the MAC cryptogram to the application 122. In some examples, the transmission of the MAC cryptogram occurs via NFC, however, the present disclosure is not limited thereto. In other examples, this communication may occur via Bluetooth, Wi-Fi, or other means of wireless data communication.

At step 108, the application 122 communicates the MAC cryptogram to the processor 124.

At step 112, the processor 124 verifies the MAC cryptogram pursuant to an instruction from the application 122. For example, the MAC cryptogram may be verified, as explained below.

In some examples, verifying the MAC cryptogram may be performed by a device other than client device 110, such as a service provider 120 in data communication with the client device 110 (as shown in FIG. 1A). For example, processor 124 may output the MAC cryptogram for transmission to service provider 120, which may verify the MAC cryptogram.

In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

More specifically, according to one aspect, a contactless card 105 may be used in conjunction with first authentication credentials provided to an application service provider to pre-authenticate a customer support request, prior to forwarding the support request to the CRM server 140. Pre-authentication of customer support requests in this manner provides a dual advantage; because authentication information is not forwarded to the CRM, the opportunity for misappropriation of such information by a call center agent is obviated. In addition, the use of the contactless card as a second factor of authentication enables the association of a particular device/phone number with a specific individual (i.e., the owner of the card), thereby removing the ability for a malicious third party to 'spoof', i.e., impersonate, the client. According to another aspect of the invention, pre-authentication communication protocols described below identify or use specific communication channels for call handling, thereby reducing the opportunity for client impersonation.

Example embodiments of systems and methods described herein may be configured to provide multi-factor security authentication which may be used to bypass authentication at a CRM 140, thereby reducing the potential for theft of sensitive customer information during call handling.

The security factor authentication may comprise a plurality of processes. A first authentication process may comprise logging in and validating a user via one or more applications executing on a device. A second authentication process may operate following successful login and validation to cause a user to engage in one or more behaviors associated with one or more contactless cards. In effect, the security factor authentication process comprises a multi-factor authentication process that may include both securely proving identity of the user and encouraging the user to engage in one or more types of behaviors, including but not limited to one or more tap gestures, associated with the contactless card. In some examples, the one or more tap gestures may comprise a tap of the contactless card by the user to a device. In some examples, the device may comprise a mobile device, a kiosk, a terminal, a tablet, or any other device configured to process a received tap gesture.

For example, to provide a first layer of authentication, a client may access the website of the service provider by linking to a service provider web page using an internet browser application executing on the client device. The browser is a software application such as Google® Chrome®, Internet Explorer®, Safari®, etc., and includes programming code for translating Hypertext Markup Language (HTML) web pages of the service provider application to a format suitable for to a client operating the client device. As part of accessing the service provider website, the service provider may request first authorization information, including password information, answers to pre-stored queries, biometric information, an image, or other mechanism of verifying that a user of the client device is authorized to access content and services, including accounts, managed by the service provider.

Certain high-risk services of provided by the service provider, such as call center support, may benefit from multi-factor authentication. For example, service providers may store first level authentication information within a client's browser as a cookie to speed up authentication processes during client log in. Browser cookies, and the associated password or other data, are vulnerable to discovery and misuse. Thus, prior to allowing the user to access or modify highly sensitive or personal information, as can happen during customer support calls, it is important to validate that the user has the authority for the access.

According to one aspect, the contactless card 105 may be used to provide a second authentication for a user of a client device. In one embodiment, and as described in more detail below, the contactless card includes a key, a counter, and cryptographic processing functionality that may be used to generate a cryptogram that may be used to validate a user of a client device. The counter advantageously reflects previous behaviors of the holder of the card. For example, the counter may reflect the number of times that the user has previously accessed a particular service of the service provider, information which is virtually impossible for a malicious third party to garner accurately.

When a client seeks access to a high-risk service, in some embodiments that service provides application may prompt the user to provide the second level of authentication using the contactless card 105, for example as mentioned above communicatively coupling the card 105 to one of the client devices 110 by tapping or otherwise.

Following the second authentication, and as will be described in more detail below, the service provider returns data to the client device. The data may include data allowing the client to initiate a communication link with the CRM server 140. Such data may include contact information, such as a link to a CRM service provider application, or a phone number for a call center. In some embodiments, the contact information may be augmented with control information for the CRM or call center. For example, control information may direct the CRM or call center to bypass any authentication or Interactive Voice Response (IVR) processes typically performed at the call center to account for the fact that the client has already been pre-authenticated by the service provider application/contactless card multi-factor authentication process.

It should be noted that although in the above description the first authentication is described as using personal, biometric, questions or other authentication information, it is recognized that in some examples, a client application executing on a device may respond to a tap of a contactless card to initially activate or launch the application of the device. In such examples, both the first and second authentication processes use the key/counter contactless card authentication process described in more detail below. In some embodiments, if the client-side application is not installed on a client device, a tap of the contactless card proximate the card reader may initiate a download of the application, (such as navigation to a download page of the application). Subsequent to installation, a tap of the contactless card may activate or launch the application, and then initiate, for example via the application or other back-end communication), activation of the contactless card. In some examples, the one or more applications may be configured to determine that it was launched via one or more tap gestures of the contactless card, such that a launch occurred at 3:51 pm, that a transaction was processed or took place at 3:56 pm, in order to verify the identity of the user.

In some examples, data may be collected on tap behaviors as biometric/gestural authentication. For example, a unique identifier that is cryptographically secure and not susceptible to interception may be transmitted to one or more backend services. The unique identifier may be configured to look up secondary information about the individual. The secondary information may comprise personally identifiable information about the user. In some examples, the secondary information may be stored within the contactless card.

Figure 2:
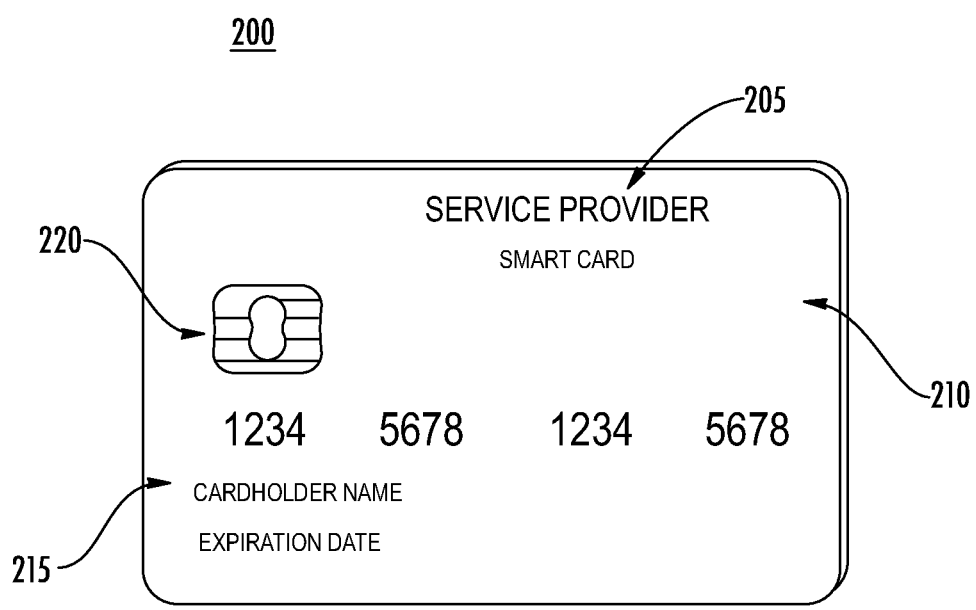
FIG. 2 is an example of a contactless card for storing authentication information that may be used in the system of FIG. 1A.

FIG. 2 illustrates one or more contactless cards 200, which may comprise a payment card, such as a credit card, debit card, or gift card, issued by a service provider 205 displayed on the front or back of the card 200. In some examples, the contactless card 200 is not related to a payment card, and may comprise, without limitation, an identification card. In some examples, the payment card may comprise a dual interface contactless payment card. The contactless card 200 may comprise a substrate 210, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 212 displayed on the front and/or back of the card, and a contact pad 220. The contact pad 220 may be configured to establish contact with another communication device, such as a user device, smart phone, laptop, desktop, or tablet computer. The contactless card 200 may also include processing circuitry, antenna and other components not shown in FIG. 2. These components may be located behind the contact pad 220 or elsewhere on the substrate 210. The contactless card 200 may also include a magnetic strip or tape, which may be located on the back of the card (not shown in FIG. 2).

Figure 3:
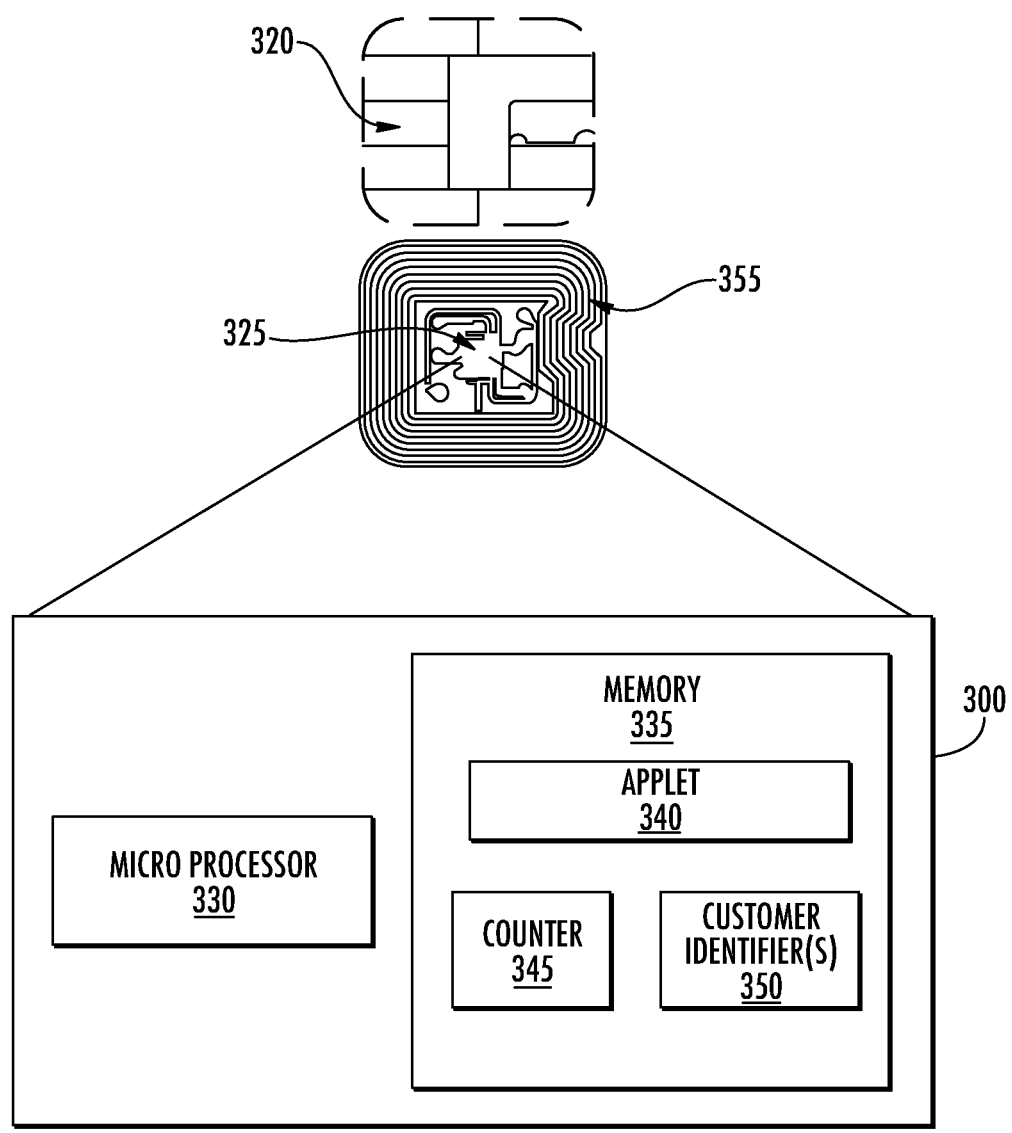
FIG. 3 is a detailed block diagram illustrating exemplary components of the contactless card of FIG. 2.

As illustrated in FIG. 3, the contact pad 220 may include processing circuitry for storing and processing information, including a microprocessor 330 and a memory 335. It is understood that the processing circuitry may contain additional components, including processors, memories, error and parity/CRC checkers, data encoders, anti-collision algorithms, controllers, command decoders, security primitives, and tamper-proofing hardware, as necessary to perform the functions described herein.

The memory 335 may be a read-only memory, write-once read-multiple memory or read/write memory, e.g., RAM, ROM, and EEPROM, and the contactless card 300 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 335 may be configured to store one or more applets 340, one or more counters 345, and a customer information 350. The one or more applets 340 may comprise one or more software applications configured to execute on one or more contactless cards, such as Java Card applet. However, it is understood that applets 340 are not limited to Java Card applets, and instead may be any software application operable on contactless cards or other devices having limited memory. The one or more counters 345 may comprise a numeric counter sufficient to store an integer. The customer information 350 may comprise a unique alphanumeric identifier assigned to a user of the contactless card 200 and one or more keys that together may be used to distinguish the user of the contactless card from other contactless card users. In some examples, the customer information 350 may include information identifying both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 220 or entirely separate from it, or as further elements in addition to microprocessor 330 and memory 335 elements located within the contact pad 220.

In some examples, the contactless card 200 may comprise one or more antennas (not shown). The one or more antennas may be placed within the contactless card 200 and around the processing circuitry of the contact pad 220. For example, the one or more antennas may be integral with the processing circuitry and the one or more antennas may be used with an external booster coil. As another example, the one or more antennas may be external to the contact pad 220 and the processing circuitry.

As explained above, the contactless cards 200 may be built on a software platform operable on smart cards or other devices that comprises program code, processing capability and memory, such as JavaCard. Applets may be added to contactless cards to generate a one-time password (OTP) for multifactor authentication (MFA) in various mobile application-based use cases. Applets may be configured to respond to one or more requests, such as near-field data exchange (NDEF) requests, from a reader, such as a mobile Near Field Communication (NFC) reader and produce an NDEF message that comprises a cryptographically secure OTP encoded as an NDEF text tag. Thus, the functionality of the contactless card is adapted to provide a unique one-time password as part of a near-field data exchange communication as described below.

Figure 4:
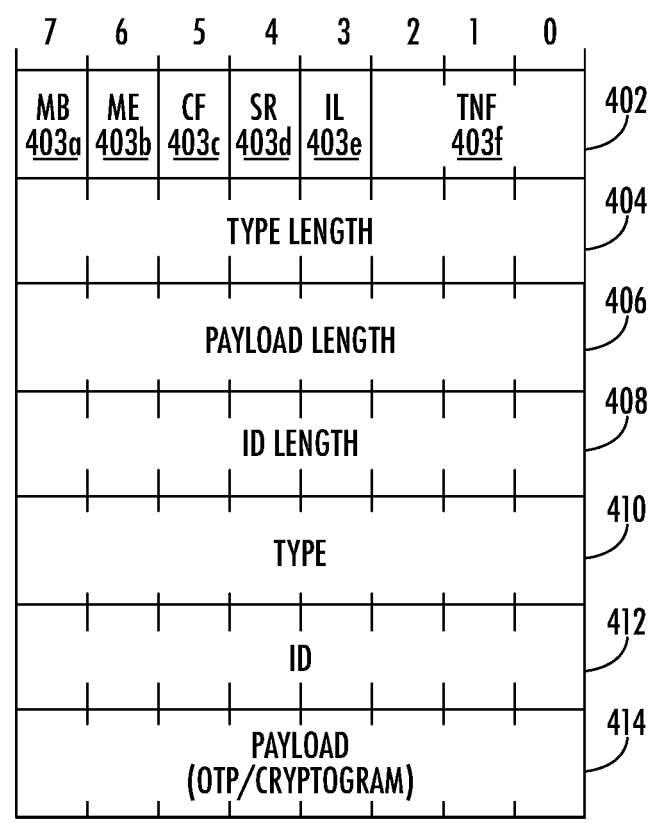
FIG. 4 is a diagram of exemplary fields of messages exchanged between a contactless card and a client device of FIG. 1A.

FIG. 4 illustrates an exemplary NDEF short-record layout (SR=1) 400 according to an example embodiment. An NDEF message provides a standardized method for a client device 110 to communicate with a contactless card 105. In some examples, NDEF messages may comprise one or more records. The NDEF record 400 includes a header 402 which includes a plurality of flags that define how to interpret the rest of the record, including a Message Begin (MB) flag 403a a Message End (ME) flag 403b, a Chunk flag (CF) 403c, a Short Record (SR) flag 403d, an ID Length (IL) flag 403e and a Type Name Format (TNF) field 403f. MB 403a and ME flag 403b may be set to indicate the respective first and last record of the message. CF 403c and IL flag 403e provide information about the record, including respectively whether the data is 'chunked' (data spread among multiple records within a message) or whether the ID type length field 408 is relevant. SR flag 403d may be set when the message includes only one record.

The TNF field 403f identifies the type of content that the field contains, as defined by the NFC protocol. These types include empty, well known (data defined by the Record Type Definition (RTD) of the NFC forum), Multipurpose Internet Mail Extensions (MIME) [as defined by RFC 2046], Absolute Uniform Resource Identifier (URI) [as defined by RFC 3986], external (user defined), unknown, unchanged [for chunks] and reserved.

Other fields of an NFC record include type length 404, payload length 406, ID length 408, Type 410, ID 412 and Payload 414. contains the length of the payload type in bytes. Type length field 404 specifies the precise kind of data found in the payload. Payload Length 406 contains the length of the payload in bytes. A record may contain up to 4,294,967,295 bytes (or 2^32−1 bytes) of data. ID Length 408 contains the length of the ID field in bytes. Type 410 identifies the type of data that the payload contains. ID field 412 provides the means for external applications to identify the whole payload carried within an NDEF record. Payload 414 comprises the message.

In some examples, data may initially be stored in the contactless card by implementing STORE DATA (E2) under a secure channel protocol. This data may include a personal User ID (pUID) that is unique to the card, as well as one or more of an initial key, cryptographic processing data including session keys, data encryption keys, random numbers and other values that will be described in more detail below. These values may be used to generate a message authentication code (MAC) that may be used to pre-authenticate a client prior to customer service handling.

Exemplary information that may be exchanged with the contactless card 105 and an authentication server 160 during initialization to populate the contactless card to support secure authentication according to aspects of this invention are shown in Table I below.

TABLE 1

| Item | Length (bytes) | Encrypted? | Notes |
| --- | --- | --- | --- |
| pUID | 8 | No | Unique Card ID |
| AutKey | 16 | Yes | 3DES Key for Deriving MAC session keys |
| AutKCV | 3 | No | Key Check Value |
| DEKKey | 16 | Yes | 3DES Key for deriving Encryption session key |
| DEKKCV | 3 | No | Key Check Value |
| Card Shared Random | 4 bytes | No | 4 Byte True Random number (pre-generated) |
| NTLV | X Bytes | No | TLV data for NDEF message |

Following initialization both the contactless card and authentication server store information for uniquely identifying the cardholder. These features may be used according to one aspect to authenticate clients access to high-risk services as described below.

Figure 5:
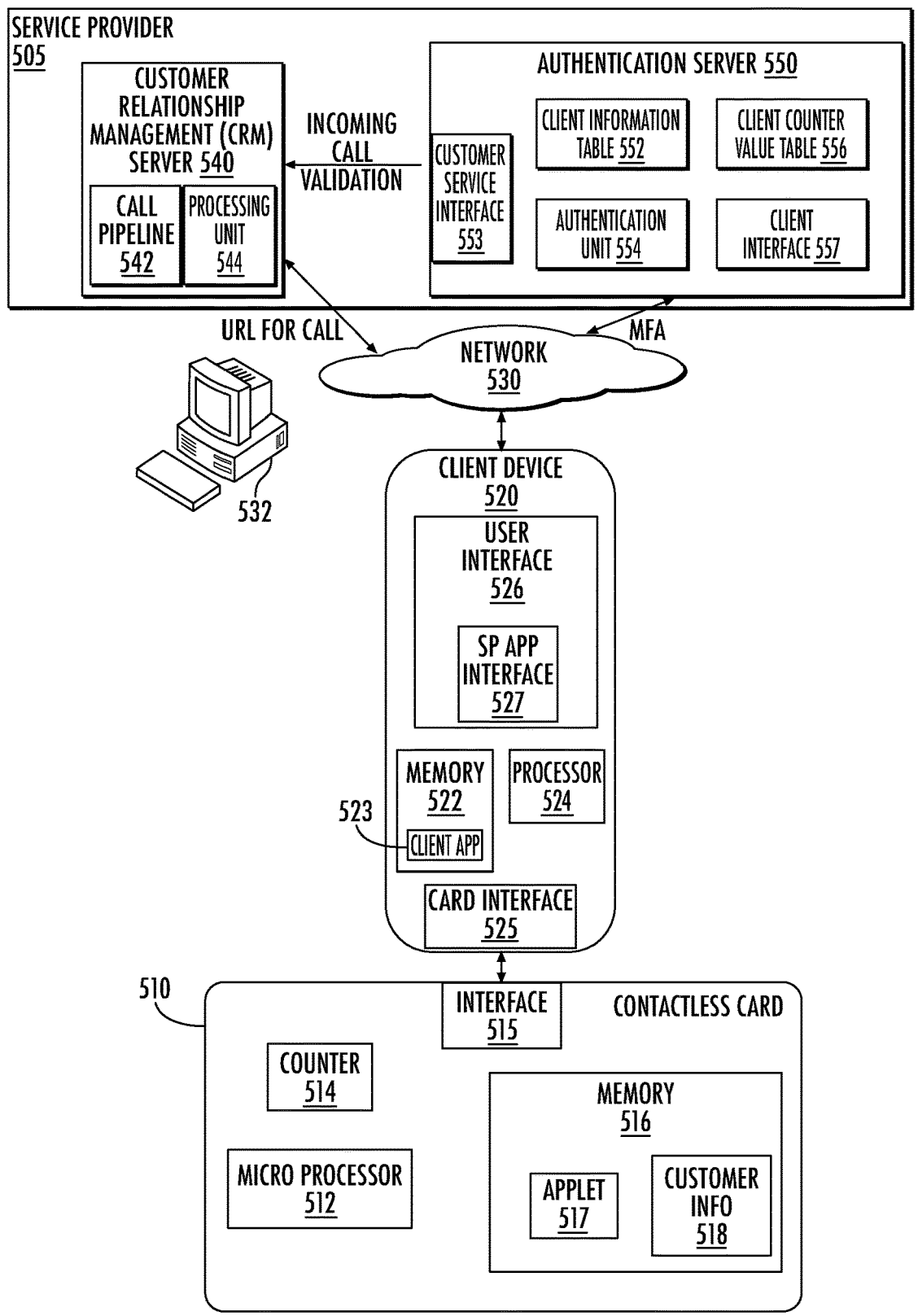
FIG. 5 a detailed block diagram of components of the system of FIG. 1A that may be utilized to support aspects of the invention.

FIG. 5 illustrates a communication system in which a contactless card 510 may store information such as that included in Table 1 may be used to authenticate a user prior to connecting the user with a high-risk service of the service provider. In one aspect, a 'high-risk service' is one which may benefit from multi-factor authentication processes due to the opportunity for the service to expose sensitive customer or other information. As described with regard to FIG. 3, each contactless card may include a memory 516 for storing customer information 518 including one or more uniquely identifying attributes, such as identifiers, keys, random numbers and the like. In one aspect, the memory further includes an authentication applet 517 operable when executed upon by microprocessor 512 for controlling authentication processes described herein. In addition, each card 510 may include one or more application transaction counters (ATC) 514, and an interface 515. As described above, in one embodiment the interface operates NFC or other communication protocols.

Client device 520 also includes a card interface 525 for communicating with the contactless card, and one or more other network interfaces (not shown) that permit the device 520 to communicate with a service provider using a variety of communication protocols as described above. The client device may further include a user interface 526, which may include one or more of a keyboard or touchscreen display, permitting communication between a service provider application and a user of the client device 520. Client device 520 further includes a memory 522 which stores information and program code controlling operation of the client device 520, including for example a client-side application 523 which may be provided to the client by a service provider to facilitate access to and use of service provider applications. In one embodiment, the client-side application 523 includes program code configured to communicate authentication information from the contactless card 510 to one or more services provided by the service provider. The client-side app 523 may be controlled via input received at a service provider (SP) application interface 527 displayed on user interface 526. For example, a user may select an icon, link or other mechanism provided as part of the SP application interface 527 to launch the client-side application to access SP application services.

As mentioned with regard to FIG. 1A, client device 520 may be connected to various services of provided by a service provider 505, including a Customer Relationship Manager (CRM) server 540 and an authentication server 550. In one embodiment, the CRM server 540 manages routing of received support calls and transfer of received calls to a call handling pipeline 542. Authentication server 550 includes a client information table 552 for storing information such as that of Table 1 for clients of a service provider. The authentication unit 554 includes hardware and software for performing various authentication processes for clients using information from table 556. In one embodiment authentication server further includes a table of client counter value table 556 which may be used as described below to perform authentication in conjunction with the contactless card 510.

Figure 6:
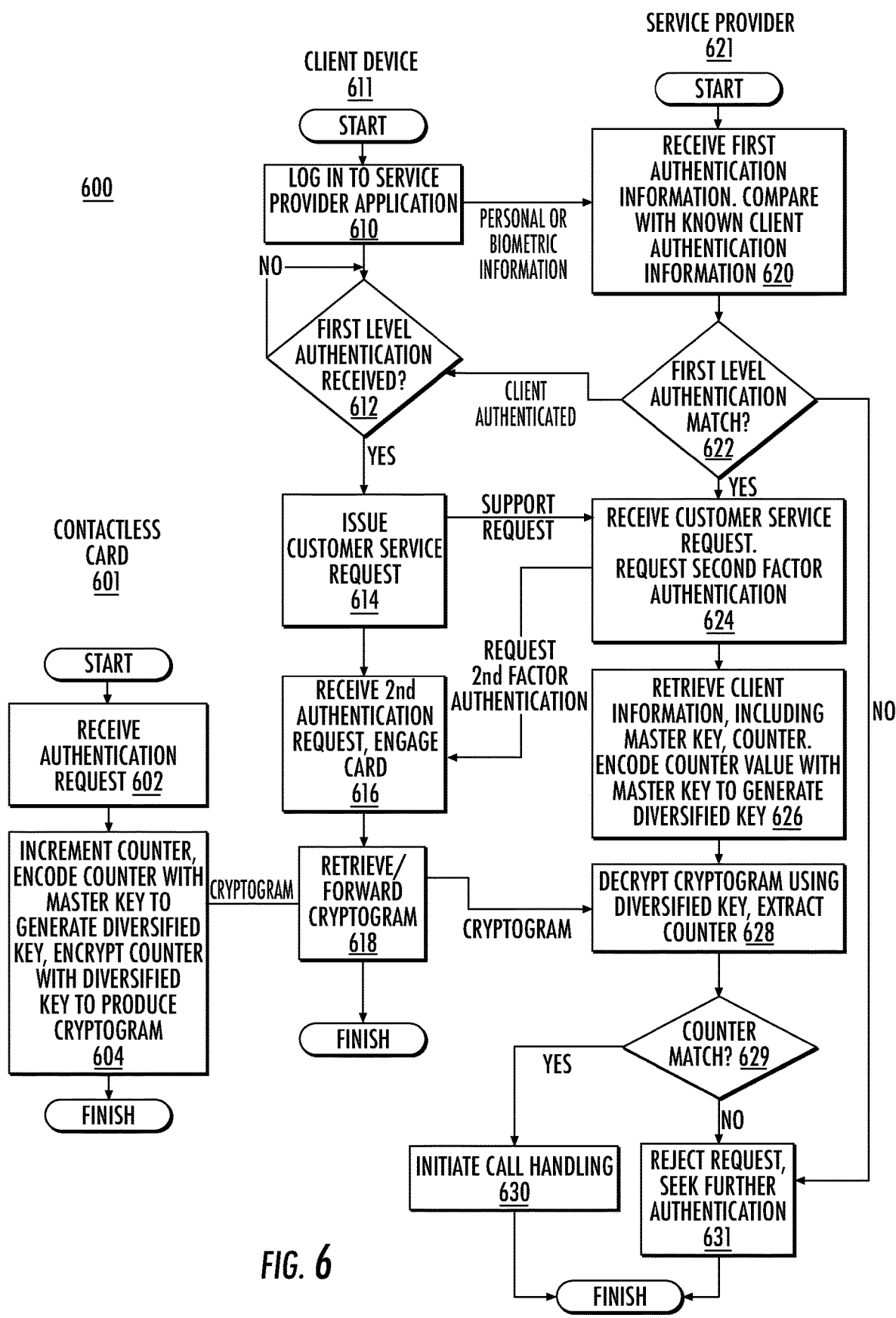
FIG. 6 is a data flow diagram provided to describe exemplary steps that may be performed in one embodiment by the components of FIG. 4 during call authentication according to aspects of the invention.

FIG. 6 illustrates various steps that may be performed by the contactless card 601, client device 611 and an authentication service of a service provider 621 which are configured to use key diversification techniques as part of a multi-factor authentication protocol for pre-authenticating clients. For example, a cardholder of contactless card 601 with access to a client device 611 may seek authentication from a service provider 621 to enable access to services, including seeking multi-factor authentication for access to high-risk services such as call center support.

At step 610, client 611 first accesses a client account maintained by a service provider 621 by exchanging login credentials with the service provider, where the login credentials may include, but not be limited to, passwords, keys, biometric data, image data, query/response exchanges, etc. In one embodiment, the client may initiate this access by launching the client-side application via the SP app interface 527. Launching the app may include displaying a service provider web page configured to accept first credential information from the user.

In some embodiments, first level authentication may be performed using a cryptogram exchange process as described below for second level authentication. The service provider app may be launched by tapping a contactless card 601 to the client device 611, initiating the cryptogram exchange.

The service provider receives the credentials at step 620 and compares these credentials against credentials for the client that are maintained by the authorization server. If the login credentials do not match at step 622, the service provider proceeds to step 631 to pursue authentication of the client device using other methods. If it is determined that there is a match at step 622, the client is authenticated, and the service provider coordinates with a client-side application maintained by client device 611 to display service provider web pages to the client to enable access to one or more services.

At step 614 the client device requests access to a high-risk application, for example, a customer service application. The client may request access, for example, by selecting one of a plurality of hyperlinks provided on a service provider website to direct the client to the selected service. The hyperlink may include, for example, a web address of a landing page for the service. Alternatively, the hyperlink may include a phone number of a customer support system.

Receiving the customer service request at step 624, the service provider determines that the selected service is a high-risk service that would benefit from a second level of authentication. For example, in an embodiment that provides second factor authentication using contactless cards, the service provider may prompt the client device to engage a contactless card to retrieve a cryptogram for verification purposes. The prompt may be any manner of indicating to the client that they should engage the contactless card, including textual prompts, visual prompts, audible prompts and other available indication mechanisms.

The client device 611 receives this request at step 616 and engages the contactless card. In one aspect, the client device uses NFC communication channels as described above to exchange messages with the contactless card the contactless card cooperates to provide second factor authentication through a combination of symmetric keys, symmetric cryptographic processing, and counters.

At step 602 the contactless card receives the authentication request. At step 604, processing components within the contactless card increment an application service transaction (AST) counter and encodes the counter using the Master Key stored in the contactless card using a symmetric cryptographic algorithm to produce a diversified key. The cryptographic algorithm may be selected from a group including at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES (Triple Data Encryption Algorithm) or Advanced Encryption Standard (AES) 128; a symmetric Hash Based Message Authentication (HMAC) algorithm, such as HMAC-SHA-256; and a symmetric cyper-based message authentication code (CMAC) algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

Processing components of contactless card may take the selected cryptographic algorithm, and using the master symmetric key, process the counter value. For example, the contactless card 601 may select a symmetric encryption algorithm and use a counter which increments with every authentication transaction processed by the contactless card. Contactless card 601 may then encrypt the counter value with the selected symmetric encryption algorithm using the master symmetric key to generate a diversified symmetric key.

In one aspect, the diversified symmetric key may be used to process the counter prior for transmission for authorization purposes. For example, the contactless card 601 may encrypt the counter value using a symmetric encryption algorithm and the diversified symmetric key, with the output comprising an encrypted MAC cryptogram. The contactless card 601 may then transmit the cryptogram to the service provider 621 for authentication.

In one embodiment, a template for an authentication message comprising a cryptogram may comprise a first record, with a well-known index for providing the actual dynamic authentication data. Table II below is one example of an authentication message that may be exchanged between client device 611 and contactless card 601.

TABLE II

| Byte Index | Value | Comment |
|---|---|---|
| 00 | D1 | Header {MB, ME, CF, SR, IL, TNF} |
| 02 | 48 | Payload Length including record ID |
| 03 | 54 | T |

TABLE II-continued

| Byte Index | Value | Comment |
|---|---|---|
| 04 | 02 | Record ID |
| 05 | 65 6E EN | (Language) |
| 07 | 43 01 00 76 a6 62 7b 67 a8 cf bb <8 MAC bytes> | |

In one example, if additional tags are to be added, the first byte may change to indicate message begin, but not end, and a subsequent record may be added. Because ID length is zero, ID length field and ID are omitted from the record. An example message shown in Table III below may include: UDK AUT key; Derived AUT session key (using 0x1234); Version 1.0; pATC=0x1234; RND=76a6627b67a8cfbb; MAC=<eight computed bytes>. The first column may comprise address/index into the NDEF message data.

TABLE III

| Message Format | | | | |
|---|---|---|---|---|
| 1 | 2 | 4 | 8 | 8 |
| 0x43 (Message Type 'A') | Version | pATC | RND | Cryptogram A (MAC) |

At step 618 the client device 611 receives the cryptogram and forwards it to service provider 621. At step 626, after the service provider requests $2^{nd}$-factor authentication at step 624, in one embodiment an authentication server of the service provider 621 retrieves client information associated with a cardholder of the contactless card associated with an account of the client using the client device. The client information may include a Master Key of the client and a counter of application service transactions of the contactless card. The service provider 621 encodes the retrieved counter value using the Master Key and a cryptographic algorithm that matches the cryptographic algorithm used by the contactless card to produce a service provider copy of a diversified key.

At step 628, the service provider uses the diversified key to decrypt the cryptogram to expose the counter value forwarded by the contactless card. At step 629, the service provider compares the exposed counter to the counter retrieved by the service provider, which provides a second authentication of the user. If there is no match, the client is not granted access to the service, and at step 631 the service provider 621 may seek to authenticate the user using other methods. If at step 629 there is a match, then the service provider initiates call handling with a CRM server at 630. In one aspect, as will be described with regards to FIG. 7 and FIG. 8, the service provide may generate one or more messages for controlling one of the CRM or the client device to leverage pre-authentication already performed by the service provider.

The next time the contactless card is used for authentication, a different counter value may be selected producing a different diversified symmetric key, making it difficult for malicious parties monitoring communications to decrypt communications. Both the service provider and the contactless card increment the counter according to a pre-determined increment pattern agreed upon by the parties. For example, the counters may increment by 1, or in a pattern, for example in increments of 1 for the first transaction, by 2 for the second, by three for the third, or by 5 for each transaction. Because the contactless card and service provider use a common counter, a common increment pattern, a common Master Key and a common cryptographic algorithm, even though the diversified key will change for each transaction, both the transmitting and receiving devices will have the same key.

As described above, in some examples, the key diversification value may be achieved using a counter value. Other non-limiting examples of the key diversification value include: a random nonce generated each time a new diversified key is needed; the full value of a counter value sent from the transmitting device and the receiving device; a portion of a counter value sent from the transmitting device and the receiving device; a counter independently maintained by the transmitting device and the receiving device but not sent between the two; a one-time-passcode exchanged between the transmitting device and the receiving device; and cryptographic hash of the counter. In some examples as described in the '119 application, one or more portions of the key diversification value may be used by the parties to create multiple diversified keys. For example, a counter may be used as the key diversification value.

In another example, a portion of the counter may be used as the key diversification value. If multiple master key values are shared between the parties, the multiple diversified key values may be obtained by the system and processes described herein. A new diversification value, and therefore a new diversified symmetric key, may be created as often as needed. In the most secure case, a new diversification value may be created for each exchange of sensitive data between the transmitting device and the receiving device. In effect, this may create a one-time use key, such as a single session key.

Various other symmetric encryption/decryption techniques that substituted for those described with regard to FIG. 6 are described in the '119 application, incorporated herein by reference.

Figure 7:
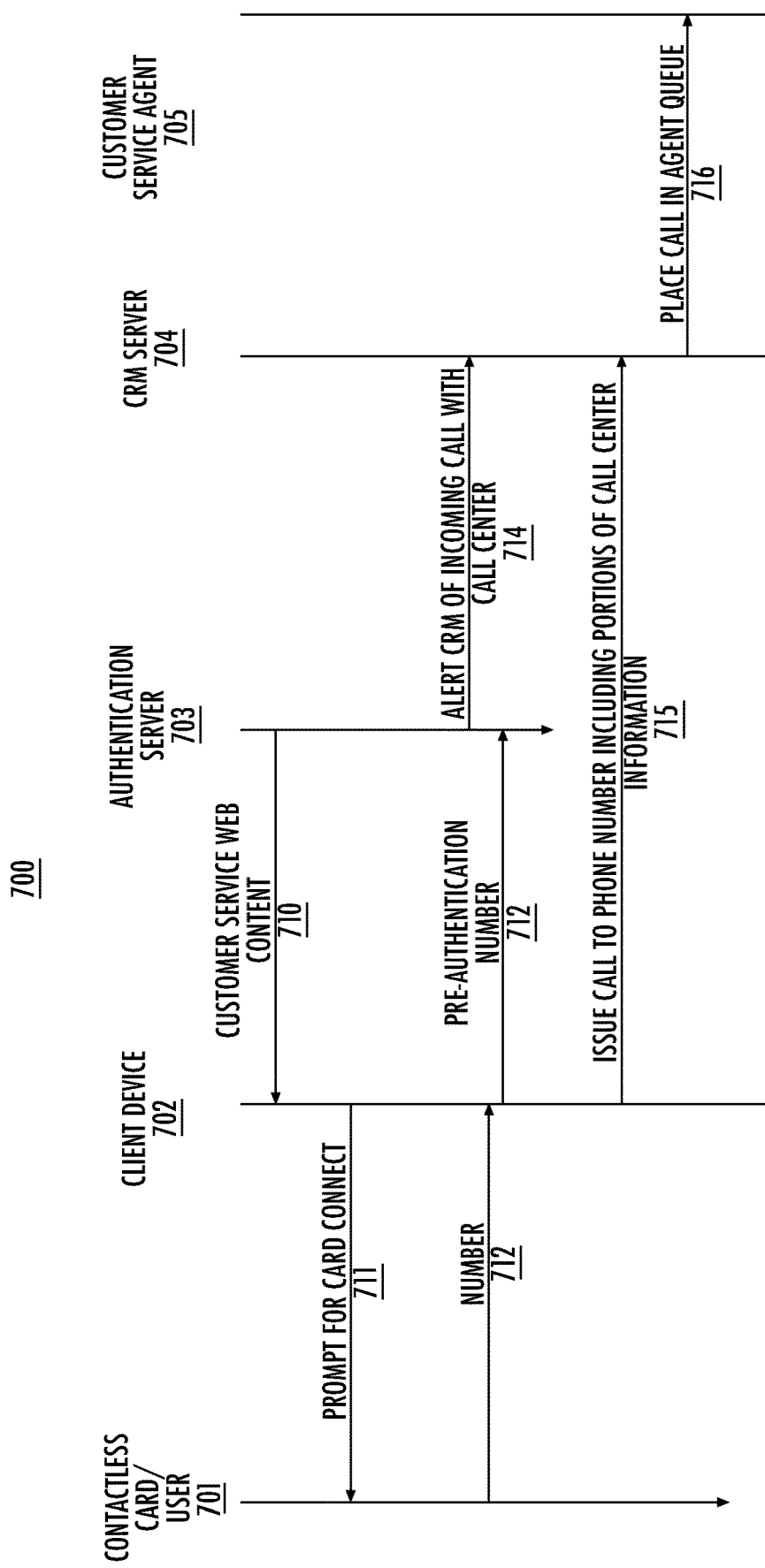
FIG. 7 is a data flow diagram provided to describe exemplary steps that may be performed during one embodiment of a call routing process which uses a contactless card of FIG. 2.
Figure 8:
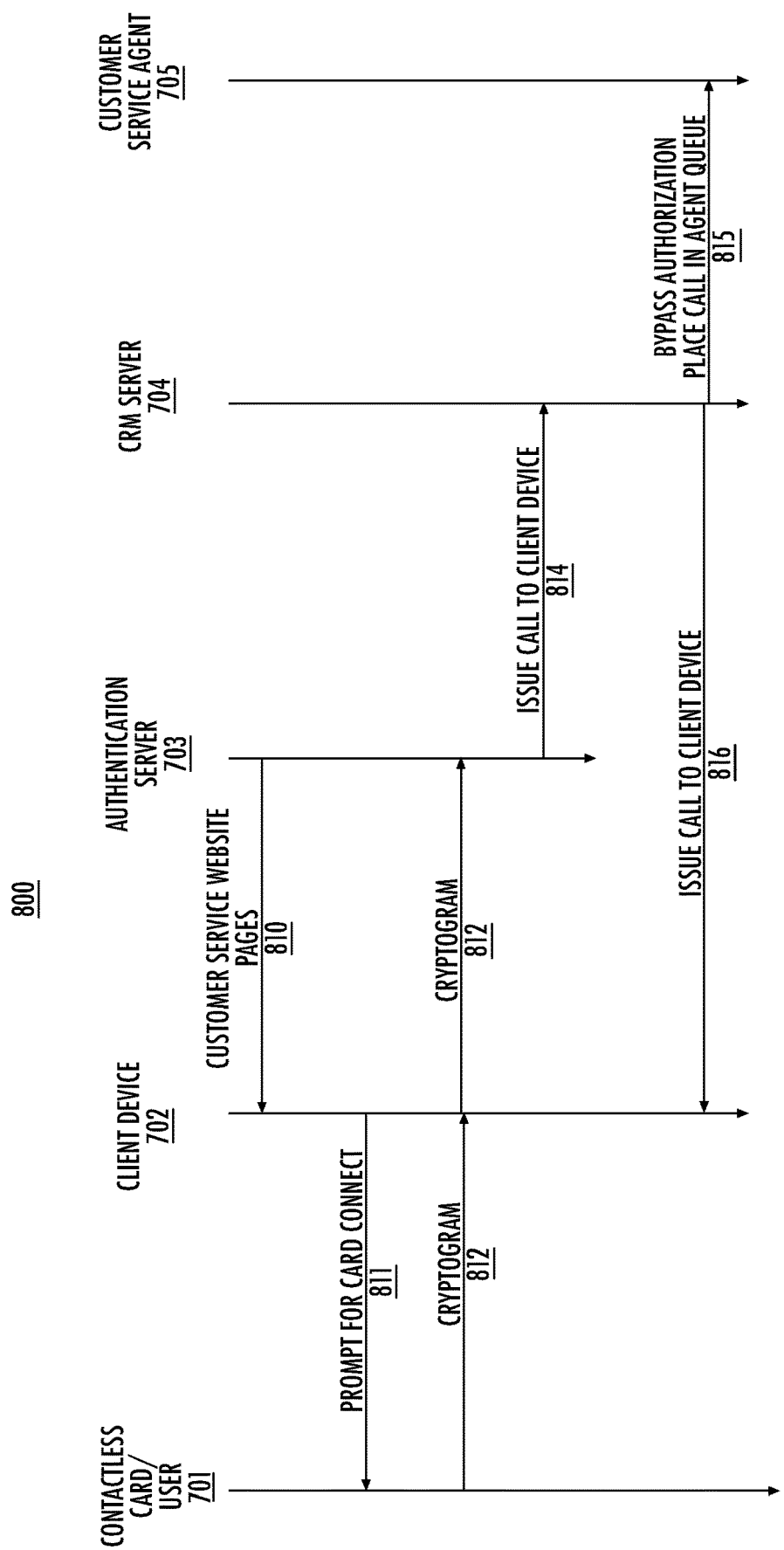
FIG. 8 is a data flow diagram provided to describe exemplary steps that may be performed during another embodiment of a call routing process which uses a contactless card of FIG. 2.

FIG. 7 and FIG. 8 each illustrate exemplary transaction flows that may be performed following a multifactor authentication of a client seeking access to call center services. In one embodiment, customer information stored on the contactless card may include call center information specific to the client. The call center information may include a number, for example. The number may comprise an IP address, phone number, or other contact address, random number or any portion or combination of an IP address, phone number or other contact address or random number. FIG. 7 illustrates exemplary messaging that may occur between components of a call routing process 700 using call center information from contactless card 701 to define a communication link between client device 702 and customer service agent 705.

Following a multifactor authentication processes shown in FIG. 6, an authentication server 703 of the service provider populates the client device 702 with customer service web content 710. The web content may include contact information, the contact information comprising a URL, phone number or other contact address for communicating with the CRM server. When the link is selected, a communication link is generated between the client device and the CRM server. According to one embodiment, the customer service web content includes a prompt 711, requesting connection with the contactless card 701.

The contactless card 701, upon receiving the prompt, forwards a stored pre-authentication number 712 to the client device, which makes it available to the authentication server 703. In one embodiment, the stored pre-authentication number 712 includes a unique number associated with pre-authentication of a client device. At least a portion of the pre-authentication number may be appended to the contact information when the communication link is generated. For example, the web content 710 may include a link to a customer service phone number 1-800-123-4567. The contactless card may provide a pre-authentication number of 7777 which the client device appends the phone number. Client device initiates a call 715 over the cellular network to -800-123-4567 , , , 7777. The authentication server 703 alerts the CRM to an incoming call with the appended number from the contactless card at 714. The CRM monitors incoming calls for those with pre-authentication numbers, and bypasses authentication when placing calls at 716 in a customer service agent pipeline.

Although the process of FIG. 7 includes a pre-authentication number stored on a contactless card, in some embodiments a client device may be configured to generate the pre-authentication number for appending to call. The pre-authentication number may be generated in response to a communication with the contactless card, for example following a cryptogram exchange with the contactless card as described in FIG. 6. In some embodiments the pre-authentication number may change for each customer support request. Such an arrangement secures customer support calls against redirection by malicious parties, as imposter client device would not possess the pre-authentication numbers, and authentication thus would not be bypassed at the CRM server.

In other embodiments, as illustrated in FIG. 8, to further protect call handling from malicious interference, call handling is initiated by the customer service agent. Following pre-authentication using the process of FIG. 6, customer support web content 810 is provided to client device 702. In one embodiment, the content includes a prompt 811 to encourage re-authorization of the client device. Contactless card 701 generates a cryptogram 812 as described above, which is forwarded via client device 702 to authentication server 703 for validation. Once the authentication server 703 validates the cryptogram, the authentication server 703 directs the CRM server 704 to bypass authorization of a call at step 815 and at step 814 directs the CRM server 704 to initiate a call via the a back-end server to the client device phone number, IP address, etc. At 816 the CRM initiates the call.

In some embodiments, the step of re-authentication may happen following initiating of the call 816 by the customer service agent 705, to ensure that the call was not re-directed between a previous authentication and call handling. Such embodiments may be beneficial when there is a delay between a previous authentication and call handling, for example, a long wait in the customer service queue, or a scheduled call back.

Figure 9:
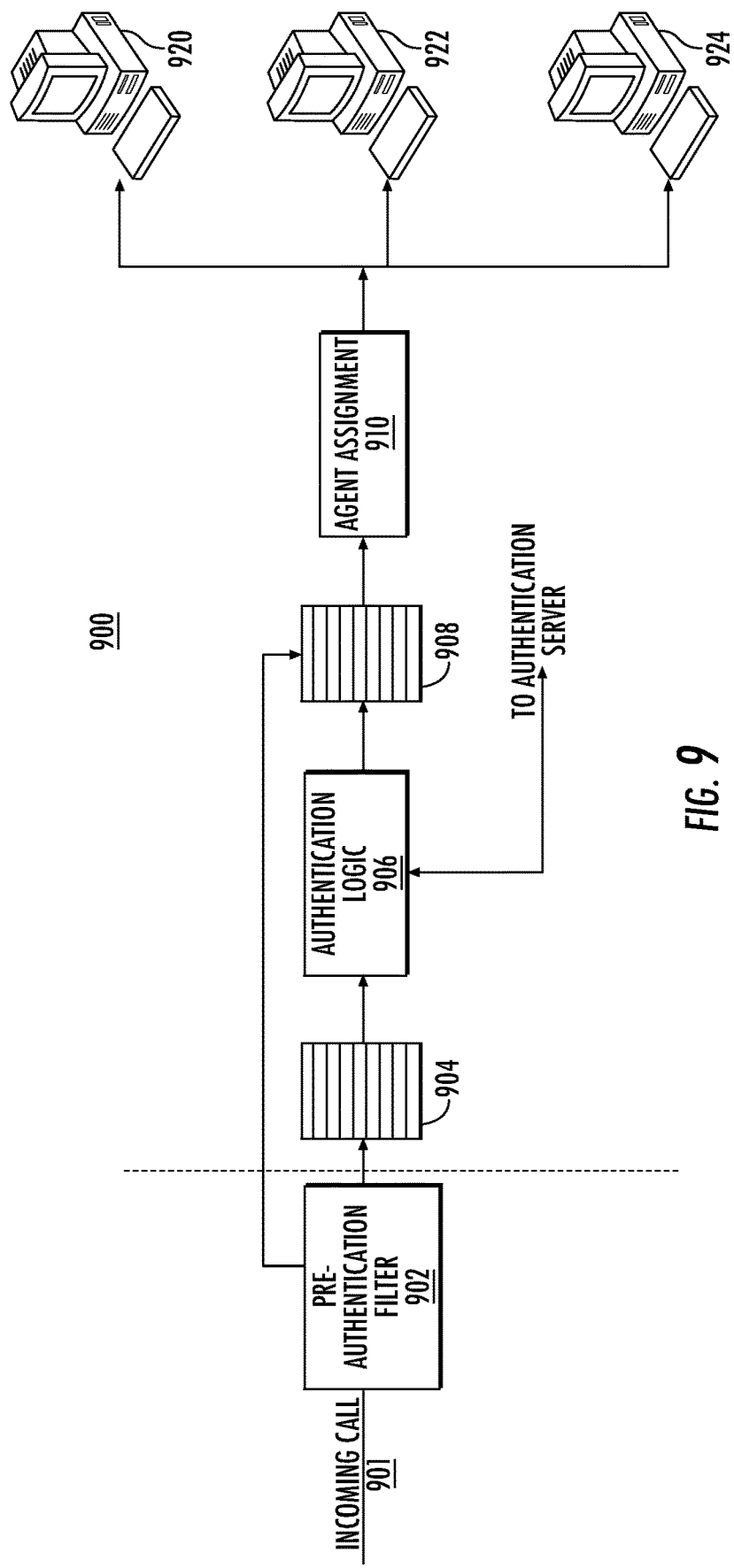
FIG. 9 is a block diagram illustrating exemplary call handling pipelines in a call service center that accepts pre-authenticated service requests.

FIG. 9 illustrates several exemplary components of one embodiment of a CRM service 900. CRM service 900 is shown to include authentication logic 906 and agent assignment unit 910. Incoming calls 901 are forwarded to a pre-authentication filter 902. Pre-authentication filter 902 may store pre-authentication numbers received from an authentication server as described above. Incoming calls which have not been pre-authenticated are forwarded to authentication queue 904. Authentication logic retrieves incoming calls from queue 904 and cooperates with an authentication server (not shown) to validate clients using any combination of authentication methods described above. Once authenticated, calls are forwarded to queue 908.

Incoming calls that are determined to be pre-authenticated are forwarded directly from the pre-authentication filter 902 to the queue 908. Advantageously to minimize the potential for malicious interference, once a call having a stored pre-authentication number is bypassed in this manner, the pre-authentication number is deleted from the pre-authentication filter 902.

Queue 908 thus stores authenticated calls, which are assigned to agents 920, 922, 924 for handling by agent assignment unit 910 in accordance with resource loading. With such an arrangement, pre-authenticated calls can be intelligently routed at a customer call center to minimize handling delays.

Accordingly, a system and method has been described that leverage multi-factor authentication features of a service provider and intelligent call routing to increase security and efficiency at a customer call center. Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
receiving, by a service provider system that includes a customer relationship management server and an authentication server following a multifactor authentication of a client device seeking access to call center services offered by the service provider that uses first authentication information, a support request from the client device, the support request being a request to access a service provider application executing the call center services;
in response to the support request, sending to the client device by the customer relationship management server, a request for second authentication information of a contactless card;
receiving, by the customer relationship management server from the client device, the second authentication information including a cryptogram;
obtaining a validation of the cryptogram based on an authentication process executed by the authentication server, which validates the client device;
responsive to the validation of the client device, receiving by service provider an incoming call from the client device, wherein the incoming call includes a pre-authentication number that is a unique number associated with pre-authentication of the client device;
filtering, by the customer relationship management server, the incoming call for the pre-authentication number; and
based on the filtering indicating the incoming call is pre-authenticated, advancing the incoming call to a position in a call handling queue that bypasses an authentication queue.

2. The method of claim 1 wherein the first authentication information includes one of credentials, biometric information, a key, or combination thereof.

3. The method of claim 2, further comprising:
authorizing the client device for access to the customer relationship management server upon receipt of a previously-received cryptogram from the client device.

4. The method of claim 1 further comprising:
maintaining by the authentication server a copy of a master key used to generate a diversity key which is used to validate the cryptogram.

5. The method of claim 4, further comprising:
decrypting, by the authentication server, information in the cryptogram received from the client device using the diversified key generated from the copy of the master key maintained by the authentication server to expose the counter value from the contactless card, wherein the counter value is included with the second authentication information of the contactless card;
comparing a counter value included in the cryptogram received from the client device to a counter value retrieved by the authentication server; and
in response to the comparison indicating a match, generating the validation.

6. A service provider, comprising:
a processor;
a customer relationship management server adapted to exchange information with one or more coupled client devices;
a storage device coupled to the processor and having a client call handling program code stored thereon; and
an authentication server configured to exchange client related information with the customer relationship management server;
wherein the client call handling program code is operable when executed upon by the processor to:
receive a support request from a client device that has been previously authorized to access a service provider application executing on the customer relationship management server based on first authentication information previously provided by the client device;
in response to the support request, send a request for second authentication information to the client device;
receive, from the client device, the second authentication information including a cryptogram;
obtaining a validation of the cryptogram from the authentication server;
responsive to the validation of the client device, receive an incoming call from the client device, wherein the incoming call includes a pre-authentication number that is a unique number associated with pre-authentication of the client device,
monitor the received call for the pre-authentication number by the customer relationship management server; and based on the monitoring, advance the incoming call to a position in a call handling queue that bypasses an authentication queue coupled to authentication logic.

7. The service provider of claim 6 wherein the first and the second authentication information includes one of credentials, biometric information, a key, or a combination thereof.

8. A method to pre-authenticate support requests includes:
receiving, by a customer relationship management server of a service provider, a support request from a client device that has previously been authorized to access a service provider application in response to first authentication information provided by the client device;
in response to receiving the support request, sending to the client device a request for second authentication information from a contactless payment card, the second authentication information including a cryptogram;
receiving the cryptogram from the client device, wherein the cryptogram includes information maintained by the card;
forwarding the received cryptogram to an authentication server of the service provider that maintains a copy of the information;
receiving by the customer relationship management server a validation of the client device from the authentication server when information of an expected cryptogram generated by the authentication server using the copy of the information matches information in the received cryptogram;
in response to the received validation of the client device, establishing contact between a call center system and the client device by forwarding communication link information to the client device or a call center support service or both, wherein the forwarded communication link information enables one of the client device or the call center support service to contact the other;
obtaining, from the client device, a pre-authentication number appended in a call to the customer support service, wherein the pre-authentication number is a unique number associated with pre-authentication of the client device; and
in response to the pre-authentication number, directing the call center support service to bypass an authorization process of the customer relationship management server for each validated client support request.

* * * * *